(12) United States Patent
Liu et al.

(10) Patent No.: US 12,739,320 B2
(45) Date of Patent: Sep. 15, 2026

(54) ELECTRONIC DEVICE

(71) Applicant: Honor Device Co., Ltd., Shenzhen (CN)

(72) Inventors: Jingbo Liu, Shenzhen (CN); Chao Liu, Shenzhen (CN); Kuibing Zhao, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 276 days.

(21) Appl. No.: 18/033,500

(22) PCT Filed: Nov. 22, 2022

(86) PCT No.: PCT/CN2022/133481

§ 371 (c)(1),
(2) Date: Apr. 24, 2023

(87) PCT Pub. No.: WO2023/142629

PCT Pub. Date: Aug. 3, 2023

(65) Prior Publication Data

US 2024/0380832 A1 Nov. 14, 2024

(30) Foreign Application Priority Data

Jan. 26, 2022 (CN) ......................... 202220218211.2

(51) Int. Cl.
*H04M 1/02* (2006.01)

(52) U.S. Cl.
CPC ....... *H04M 1/0283* (2013.01); *H04M 1/0264* (2013.01); *H04M 1/0274* (2013.01)

(58) Field of Classification Search
CPC .... H04M 1/0283; H04M 1/02; H04M 1/0266; H04M 1/0296; H04M 1/0264; H04M 1/0274; G02B 7/28; G06F 1/167; H04N 5/225; A45C 13/00; F16B 12/00
See application file for complete search history.

(56) References Cited

FOREIGN PATENT DOCUMENTS

| | | | |
|---|---|---|---|
| CN | 205148898 | U | 4/2016 |
| CN | 106790784 | A | 5/2017 |
| CN | 109547688 | A | 3/2019 |
| CN | 110290237 | A | 9/2019 |
| CN | 210380949 | U | 4/2020 |
| CN | 112615951 | A | 4/2021 |
| CN | 112738305 | A | 4/2021 |
| CN | 213279816 | U | 5/2021 |
| CN | 214101431 | U | 8/2021 |
| CN | 113726926 | A | 11/2021 |
| CN | 113950209 | A | 1/2022 |
| CN | 218276765 | U | 1/2023 |
| WO | 2021164499 | A1 | 8/2021 |

*Primary Examiner* — Anthony S Addy
(74) *Attorney, Agent, or Firm* — Slater Matsil, LLP

(57) ABSTRACT

An electronic device which includes a rear cover, a mounting member, a camera assembly, and a decorative ring. The rear cover is provided with a mounting hole. The mounting member is fixed to an inner wall of the rear cover, a part of the mounting member protrudes from the mounting hole, and the part of the mounting member that protrudes from the mounting hole is provided with a fixing hole. The camera assembly includes a lens, where the lens is fixed to the fixing hole. The decorative ring is fixed to the part of the mounting member that protrudes from the mounting hole, where the decorative ring abuts against an inner wall of the mounting hole, a surface of the decorative ring away from the mounting member is a first surface, the first surface is an inclined surface.

20 Claims, 10 Drawing Sheets

ELECTRONIC DEVICE

CROSS-REFERENCE TO RELATED APPLICATIONS

This application is a national stage of International Application No. PCT/CN2022/133481, filed on Nov. 22, 2022, which claims priority to Chinese Patent Application No. 202220218211.2, filed on Jan. 26, 2022. The disclosures of both of the aforementioned applications are hereby incorporated by reference in their entireties.

TECHNICAL FIELD

This application relates to the technical field of electronic devices, and in particular, to an electronic device.

BACKGROUND

With the development of science and technologies, electronic devices have been popularized to people's life. For example, mobile phones, being convenient to carry and having practical functions, can meet daily living demands of people and therefore develop rapidly.

A photographing function of a mobile phone is necessary. In addition, a camera module and a camera decorative member of the mobile phone are upgraded continuously as a user requirement becomes higher and higher.

Because a quantity of cameras in the camera module increases continuously, a camera substrate becomes larger and larger, and a structure space required for the overall camera module also becomes larger and larger. As a result, a camera decorative structure on the back of the mobile phone protrudes from a rear cover, which diminishes an overall appearance aesthetic, and a user has a poor sense of experience of holding the mobile phone.

SUMMARY

Embodiments of this application provide an electronic device for resolving a problem that a camera decorative structure of the electronic device protrudes from a rear cover, which diminishes an overall appearance aesthetic, and leads to a poor user experience.

To achieve the foregoing objective, the following technical solutions are used in the embodiments of this application:

This application provides an electronic device. The electronic device includes a rear cover, a mounting member, a camera assembly, and a decorative ring. The rear cover is provided with a mounting hole. The mounting member is fixed to an inner wall of the rear cover, a part of the mounting member protrudes from the mounting hole, and the part of the mounting member that protrudes from the mounting hole is provided with a fixing hole. The camera assembly includes a lens, where the lens is fixed to the fixing hole. The decorative ring is fixed to the part of the mounting member that protrudes from the mounting hole, where the decorative ring abuts against an inner wall of the mounting hole, a surface of the decorative ring away from the mounting member is a first surface, the first surface is an inclined surface, a vertical distance between an inner ring edge of the first surface and the rear cover is a first distance, a vertical distance between an outer ring edge of the first surface and the rear cover is a second distance, and the first distance is greater than the second distance.

In the electronic device provided in this application, the decorative ring is arranged between the rear cover and the part of the mounting member that protrudes from the mounting hole, the first surface of the decorative ring is arranged to be an inclined surface, and the first distance is greater than the second distance, so that a crater structure can be formed, that is, a part of the camera assembly that protrudes from the rear cover forms a gradually diffuse structure. In this way, the protruding part of the camera assembly, the rear cover of a mobile phone, and the decorative ring form an appearance integration, thereby being conducive to improving an overall aesthetic. In addition, because the first surface of the decorative ring is the inclined surface, an inclined surface for transition is formed between the protruding part of the camera assembly and an outer wall of the rear cover. When a user holds the electronic device, the decorative ring can support a palm of the user, so the user does not feel uncomfortable due to the protruding part of the camera assembly, thereby being conducive to improving user experience.

In some embodiments of this application, the electronic device further includes a connecting member. The connecting member is arranged between the inner wall of the mounting hole and an outer wall of the decorative ring, the connecting member is connected to the mounting member, and the connecting member abuts against the rear cover and the decorative ring. By fixedly connecting the connecting member and the mounting member, connection strength of an overall structure can be improved, thereby being conducive to improving overall connection stability.

In some embodiments of this application, the connecting member includes a connecting body and a snap hook. The connecting body is arranged between the inner wall of the mounting hole and the outer wall of the decorative ring. The snap hook is connected to the connecting body to be an integral structure. A snap groove is arranged on the mounting member, and the snap hook is in a snap connection to the snap groove. In this way, through the snap connection of the snap hook and the snap groove, on one hand, the connection strength of the overall structure can be improved; and on the other hand, difficulties of mounting and disassembly can be reduced, thereby facilitating disassembly and maintenance of the electronic device.

In some embodiments of this application, a surface of the connecting body away from the snap hook is a second surface, the second surface is an inclined surface, and an inclination angle of the second surface is the same as an inclination angle of the first surface. The second surface of the connecting body is arranged to be an inclined surface and the inclination angle of the second surface is arranged to be the same as the inclination angle of the first surface. In this way, the protruding part of the camera assembly and the rear cover can further form an integral structure, that is, a smooth transition between the protruding part of the camera assembly and the rear cover, to improve an overall structure aesthetic.

In some embodiments of this application, the mounting member includes a first portion and a second portion. The first portion is fixedly connected to the inner wall of the rear cover. The second portion is connected to the first portion to be an integral structure, where the second portion protrudes from the mounting hole, and the second portion is provided with the fixing hole. The second portion protrudes from the mounting hole of the rear cover. In this way, the camera assembly can be mounted at the fixing hole of the second portion, so that a decorative board is fixed to the second portion, and a gradual transition structure between a camera protruding part and the rear cover can be implemented.

In some embodiments of this application, a step surface is formed at a junction of the first portion and the second portion, the step surface faces a direction away from the fixing hole, and the snap groove is arranged on the step surface. In this way, a snap connection between the connecting member and the mounting member can be implemented by snapping the snap hook into the snap groove.

In some embodiments of this application, a first guide inclined surface is arranged on a surface of the snap hook that faces the first portion, and the first guide inclined surface is configured to guide the snap hook to snap into the snap groove. During mounting, the first guide inclined surface enables the formation of separation along a direction parallel to an inclined surface, so that the snap hook slides along the first guide inclined surface, to allow the snap hook to snap into the snap groove.

In some embodiments of this application, a second guide inclined surface is arranged on an edge of the step surface away from the first portion, and an inclination angle of the second guide inclined surface is the same as an inclination angle of the first guide inclined surface. In this way, during mounting, when the snap hook abuts against the second portion, the first guide inclined surface and the second guide inclined surface abut against each other and slide relatively, to further reduce the difficulty of mounting.

In some embodiments of this application, an edge of the mounting hole is bent in a direction facing the mounting member to form an abutting portion, and a surface of the connecting body that faces the mounting member abuts against a surface of the abutting portion away from the mounting member. In this way, the edge of the mounting hole of the rear cover can abut between the connecting body and the mounting member, thereby further improving connection strength among the rear cover, the camera assembly, and the mounting member. In addition, it is conducive to protecting the edge of the mounting hole of the rear cover and preventing a material on the edge of the mounting hole from falling off.

In some embodiments of this application, the rear cover includes a rear cover body and a decorative layer. The decorative layer is fixed to a surface of the rear cover body away from the mounting member, where the abutting portion is formed on the decorative layer. Through the decorative layer, an overall appearance of the electronic device can be further improved, and a feeling of holding the electronic device of the user can be improved.

In some embodiments of this application, the decorative layer is made of a polyurethane material.

In some embodiments of this application, the rear cover body is made of a glass fiber material or a polycarbonate material.

In some embodiments of this application, a boss is formed on an inner wall of the fixing hole, and the lens is fixed to a surface of the boss that faces the outside of the electronic device. In this way, a surface of the lens can be attached and fixed to the boss, thereby reducing the difficulty of mounting and improving fixing strength of the lens.

In some embodiments of this application, the boss extends circumferentially around the fixing hole through one circle. In this way, the boss forms an annular structure around the fixing hole through one circle, to increase an attachment area between the boss and the lens, further improve the fixing strength of the lens, and improve supporting strength of the boss.

In some embodiments of this application, a plurality of bosses are arranged, and the plurality of bosses are evenly distributed circumferentially around the fixing hole. The plurality of bosses are evenly distributed. On one hand, the lens can be supported. On the other hand, materials can be reduced, thereby being conducive to reducing costs.

Figure 1:
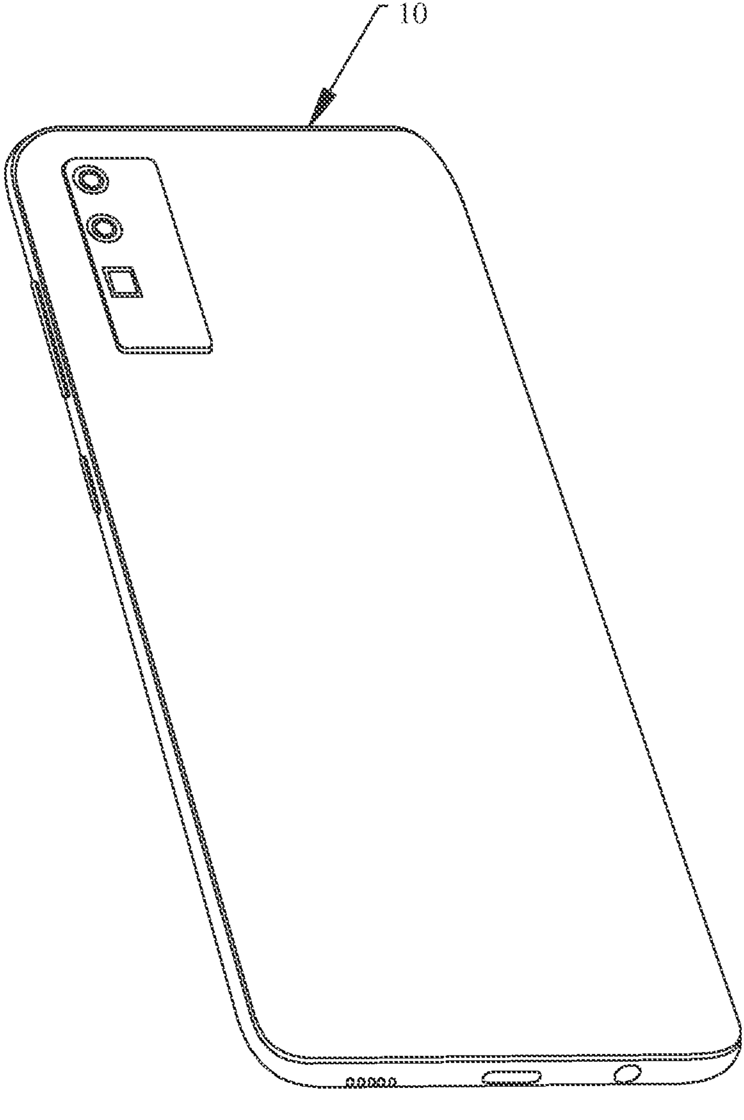
FIG. 1 is a three-dimensional view of an electronic device according to an embodiment of this application.

Reference numerals: 10—Electronic device; 100—Screen; 200—Middle frame; 300—Rear cover; 301—Connecting portion; 310—Mounting hole; 320—Decorative layer; 321—Abutting portion; 330—Rear cover body; 400—Printed circuit board assembly; 500—Camera assembly; 510—Lens; 600—Mounting member; 610—First portion; 620—Second portion; 621—Snap groove; 630—Fixing hole; 640—Boss; 650—Step surface; 651—Second guide inclined surface; 700—Decorative ring; 710—First surface; 800—Connecting member; 810—Connecting body; 811—Second surface; 820—Snap hook; 821—First guide inclined surface.

DETAILED DESCRIPTION OF ILLUSTRATIVE EMBODIMENTS

The following describes technical solutions in embodiments of this application with reference to accompanying drawings in the embodiments of this application. Apparently, the described embodiments are merely some rather than all embodiments of this application.

The terms "first", "second", and the like mentioned below are merely intended for a purpose of description, and shall not be understood as an indication or implication of relative importance or implicit indication of the quantity of indicated technical features. Therefore, a feature defined by "first", "second", or the like may explicitly or implicitly includes one or more of the feature.

In addition, in this application, orientation terms such as "upper" and "lower" are defined relative to the orientations in which components in the accompanying drawings are schematically placed. It should be understood that these orientation terms are relative concepts, are used for relative description and clarification, and may be correspondingly changed based on changes in the orientations in which the components are placed in the accompanying drawings.

It should be further understood that, in this application, unless otherwise explicitly specified or defined, the term "connection" should be understood in a broad sense. For example, the "connection" may be a fixed connection, a detachable connection, or an integral connection; or the "connection" may be a direct connection, or an indirect connection through an intermediary.

This application provides an electronic device 10. The electronic device 10 may include a device that is required to store data, such as a mobile phone, a tablet personal computer (tablet personal computer), a laptop computer (laptop computer), a personal digital assistant (personal digital assistant, PDA), a camera, a personal computer, a notebook computer, an in-vehicle device, a wearable device, or the like. A specific form of the electronic device 10 is not specially limited in the embodiments of this application. For ease of description, as shown in FIG. 1, the following provides all description by using an example in which the electronic device 10 is a mobile phone.

Figure 2:
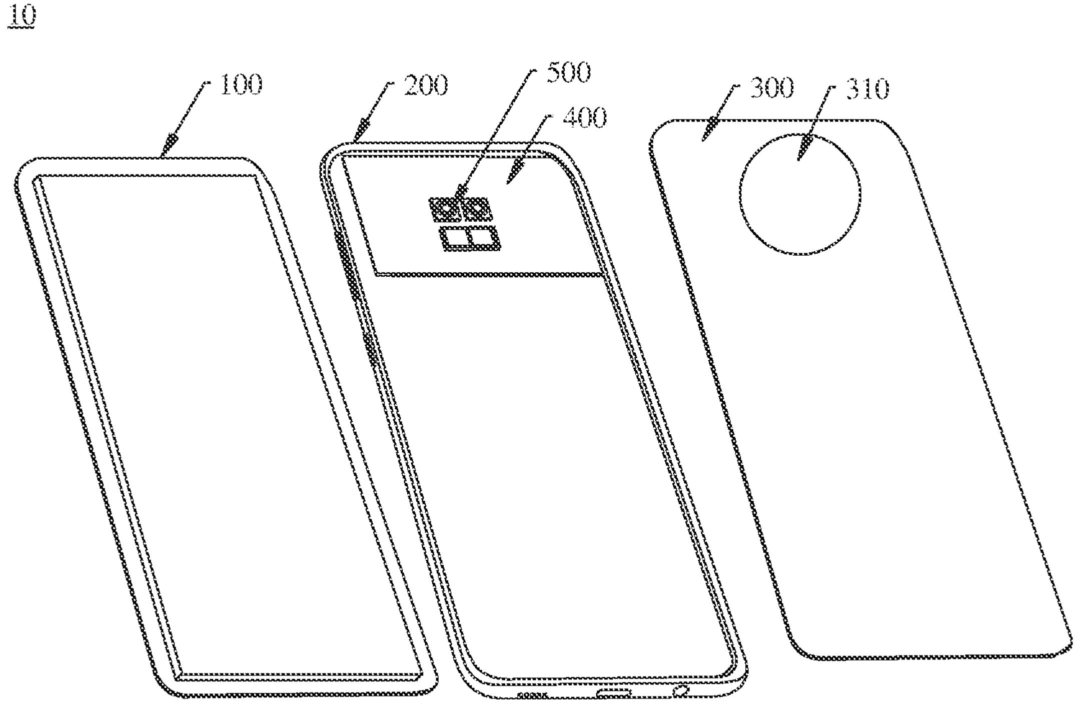
FIG. 2 is an exploded view of an electronic device according to an embodiment of this application.

Refer to FIG. 1 and FIG. 2. FIG. 1 is a three-dimensional view of an electronic device 10 according to some embodiments of this application, and FIG. 2 is an exploded view of the electronic device 10 shown in FIG. 1. In view of this, in the embodiments, the electronic device 10 is a mobile phone. As shown in the figure, the electronic device 10 may include a screen 100, a middle frame 200, a rear cover 300, a printed circuit board assembly (printed circuit board assembly, PCBA) 400 fixed to the middle frame 200, and a camera assembly 500.

As shown in FIG. 2, the middle frame 200 and the rear cover 300 of the electronic device 10 compose a housing of the electronic device 10. The housing is configured to protect components inside the electronic device 10, and can make an appearance of the electronic device 10 more aesthetic. In addition, the rear cover 300 is provided with a mounting hole 310 to expose the camera assembly 500.

Figure 3:
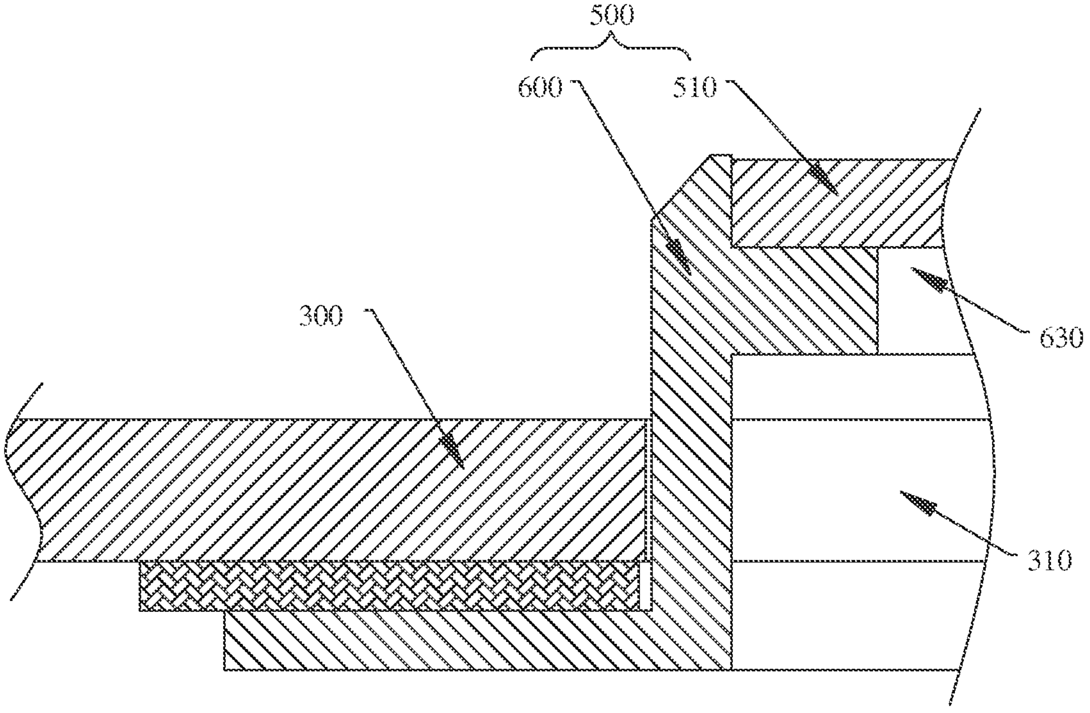
FIG. 3 is a cross-sectional view of a partial structure of an electronic device provided
in the prior art.

FIG. 3 is a cross-sectional view of a partial structure of an electronic device provided in the prior art. With reference to FIG. 2 and FIG. 3, the foregoing camera assembly 500 includes a camera body (not shown in the figure), a mounting member 600, and a lens 510, and the camera body is arranged inside the housing of the electronic device 10. The mounting member 600 is mounted at the mounting hole 310 on the rear cover 300, and a part of the mounting member protrudes from the rear cover 300. The lens 510 is mounted at a fixing hole 630 on the part of the mounting member 600 that protrudes from the rear cover 300.

To improve a photographing effect, in the prior art, a quantity of camera bodies arranged inside the electronic device 10 continuously increases. As a result, an overall structure of the camera assembly 500 is continuously enlarged. Therefore, the camera assembly 500 protrudes from the rear cover 300, an overall structure of the electronic device 10 is not aesthetic enough due to the protruding part, and a sense of comfort of a user when holding the electronic device 10 is affected.

Figure 4:
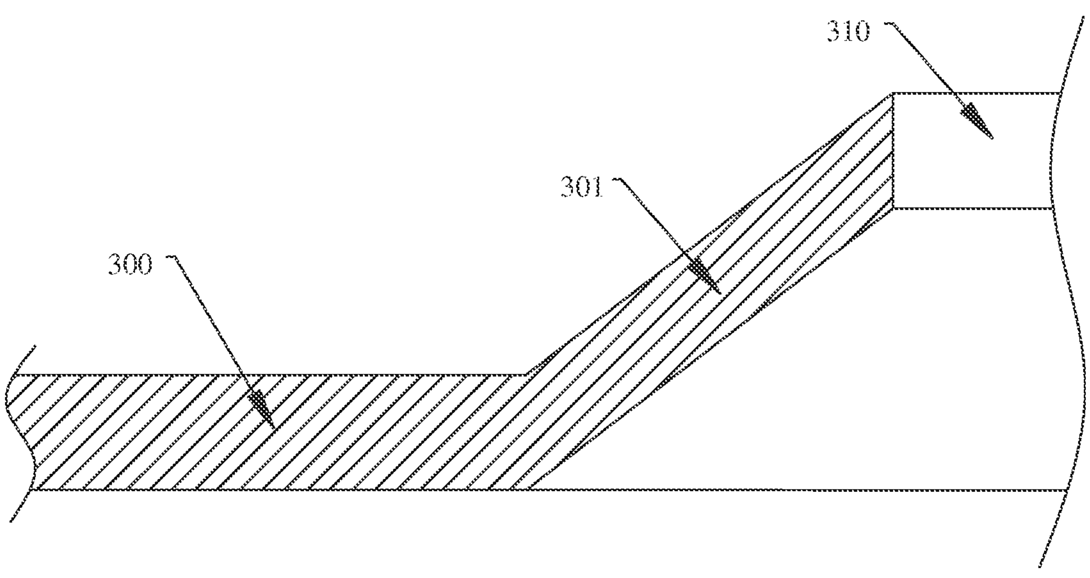
FIG. 4 is a cross-sectional view of a partial structure of a rear cover of an electronic device provided in the prior art.
Figure 5:
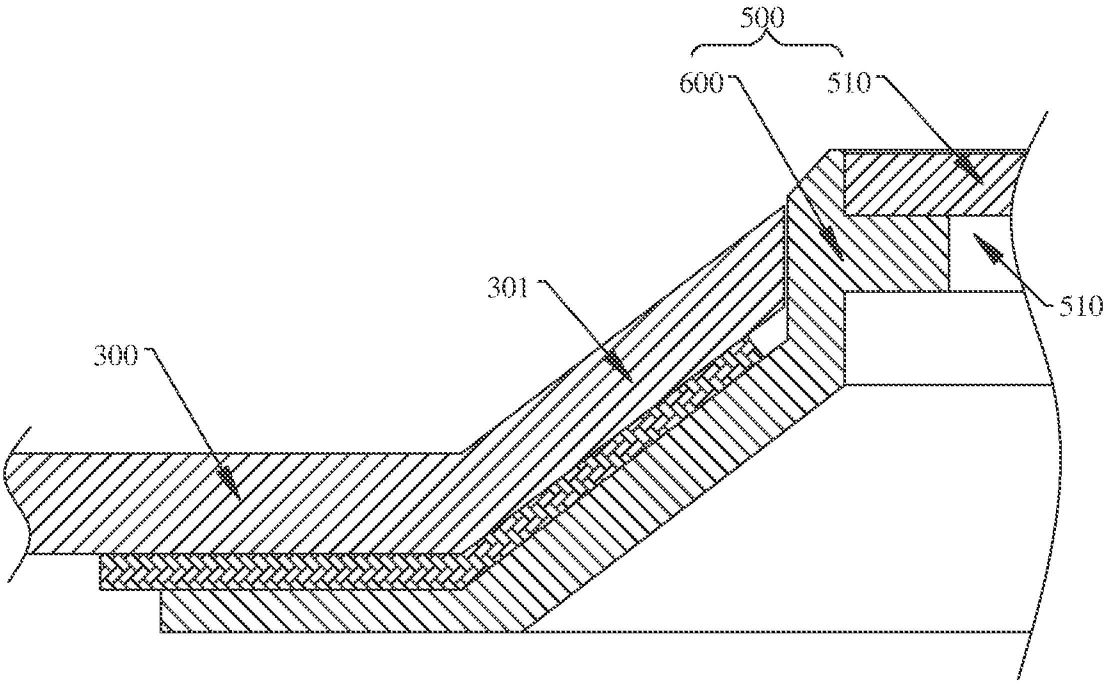
FIG. 5 is a cross-sectional view of a partial structure of another electronic device provided in the prior art.

To resolve the foregoing problem, as shown in FIG. 4, in the prior art, an edge of the mounting hole 310 of the rear cover 300 is inclined and extended to form a connecting portion 301. As shown in FIG. 5, the connecting portion 301 extends in a direction close to the camera assembly 500, and forms a transition structure, namely, a gradually extending crater structure, between the part of the camera assembly 500 that protrudes from the rear cover 300 and the rear cover 300, so that the rear cover 300 and the camera assembly 500 of the electronic device 10 can form an appearance integration, thereby being conducive to an overall aesthetic of the electronic device 10. In addition, when the user holds the electronic device 10, the connecting portion 301 can support a palm or fingers of the user, thereby improving the sense of comfort of the user when holding the electronic device 10.

However, when manufacturing the rear cover 300 in the foregoing technical solutions, a specified process step is required for forming the foregoing connecting portion 301. Therefore, a production difficulty and production costs increase.

Figure 6:
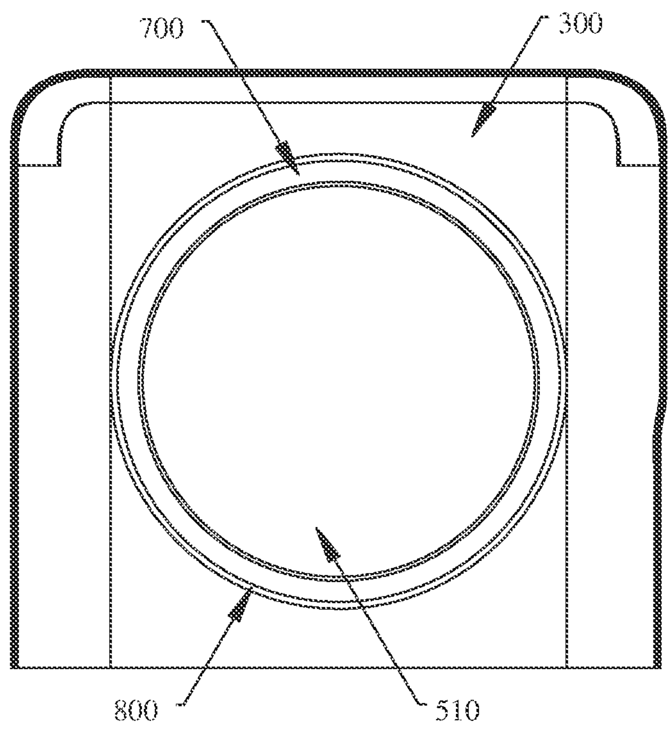
FIG. 6 is a structural diagram of an electronic device according to an embodiment of this application.
Figure 7:
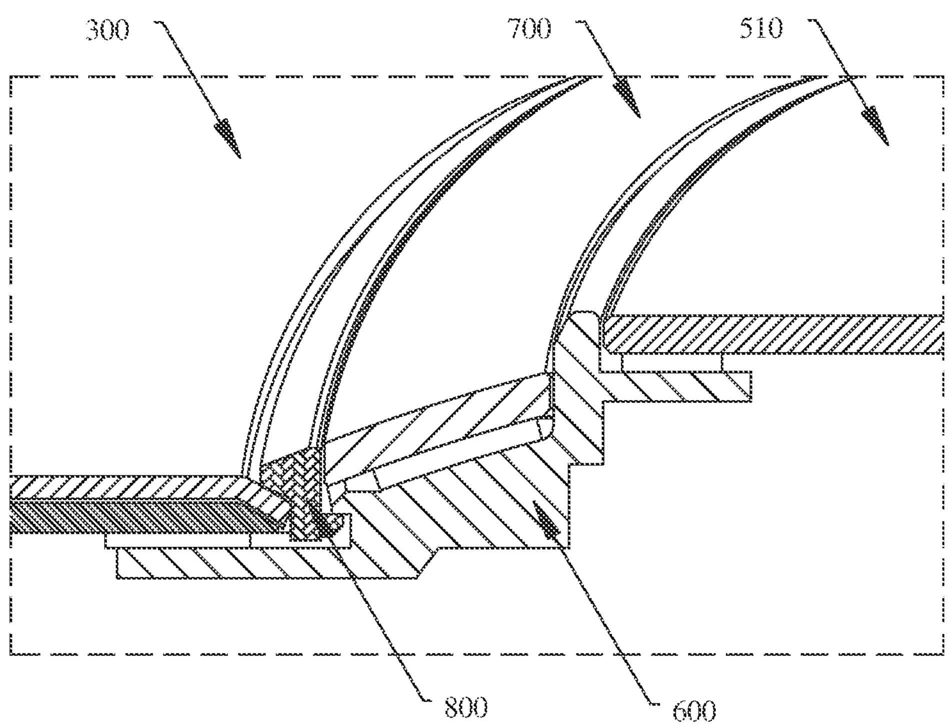
FIG. 7 is a cross-sectional view of a partial structure of an electronic device according to an embodiment of this application.

In this application, to resolve the foregoing problem, as shown in FIG. 6 and FIG. 7, FIG. 6 is a diagram of a structure of an electronic device 10 according to an embodiment of this application, and FIG. 7 is a cross-sectional view of a structure of an electronic device according to an embodiment of this application. The electronic device 10 includes a rear cover 300, a mounting member 600, a decorative ring 700, a connecting member 800, and a camera assembly 500 (only a lens 510 of the camera assembly 500 is shown in FIG. 6 and FIG. 7).

Figure 8:
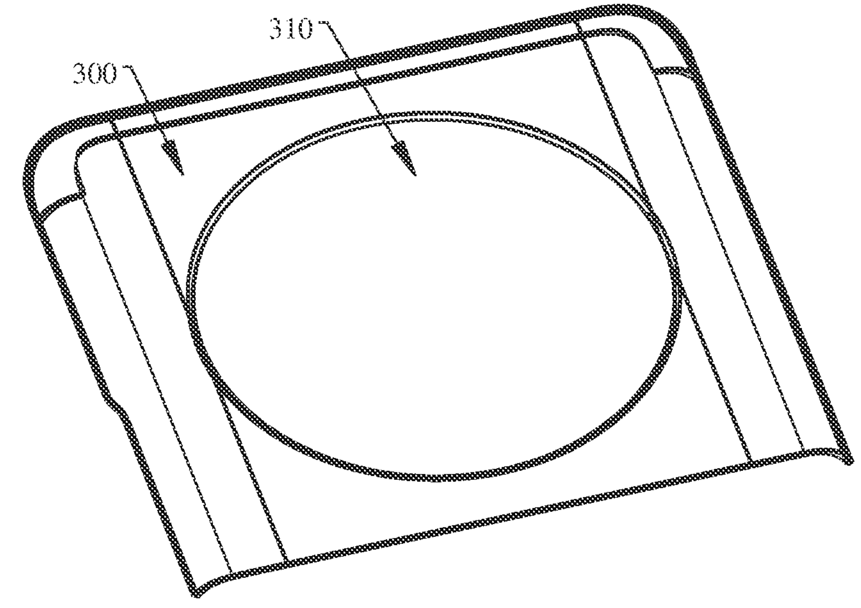
FIG. 8 is a three-dimensional view of a rear cover of an electronic device according to an embodiment of this application.
Figure 9:
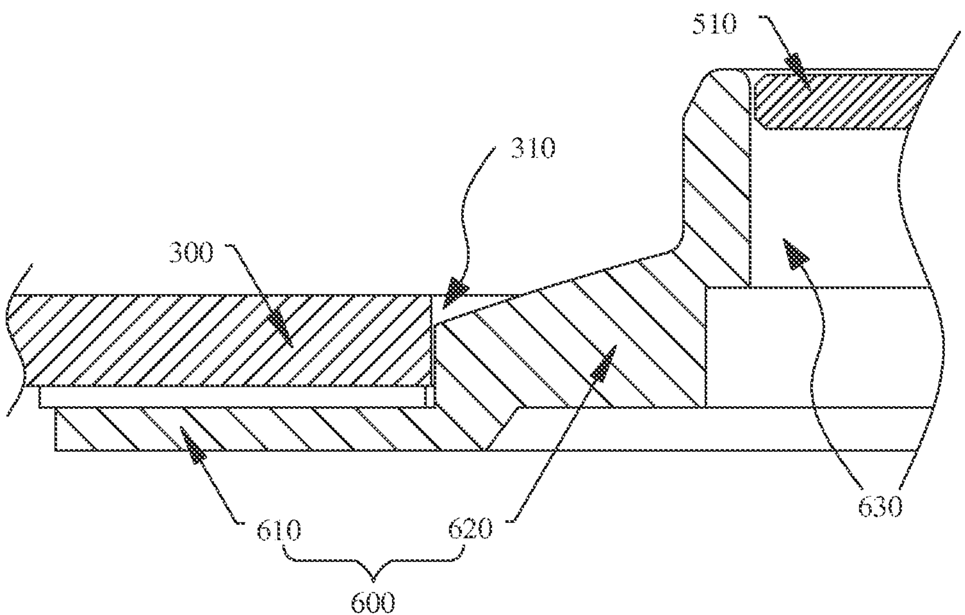
FIG. 9 is a cross-sectional view of partial structures between a mounting member and a rear cover according to an embodiment of this application.

Specifically, as shown in FIG. 8, the foregoing rear cover 300 is provided with a mounting hole 310. As shown in FIG. 9, the mounting member 600 includes a first portion 610 and a second portion 620. The first portion 610 is fixed to the inside of the rear cover 300. The second portion 620 protrudes from the mounting hole 310 of the rear cover 300, and the second portion 620 is provided with a fixing hole 630. The lens 510 of the camera assembly 500 is fixed to the fixing hole 630.

Figure 10:
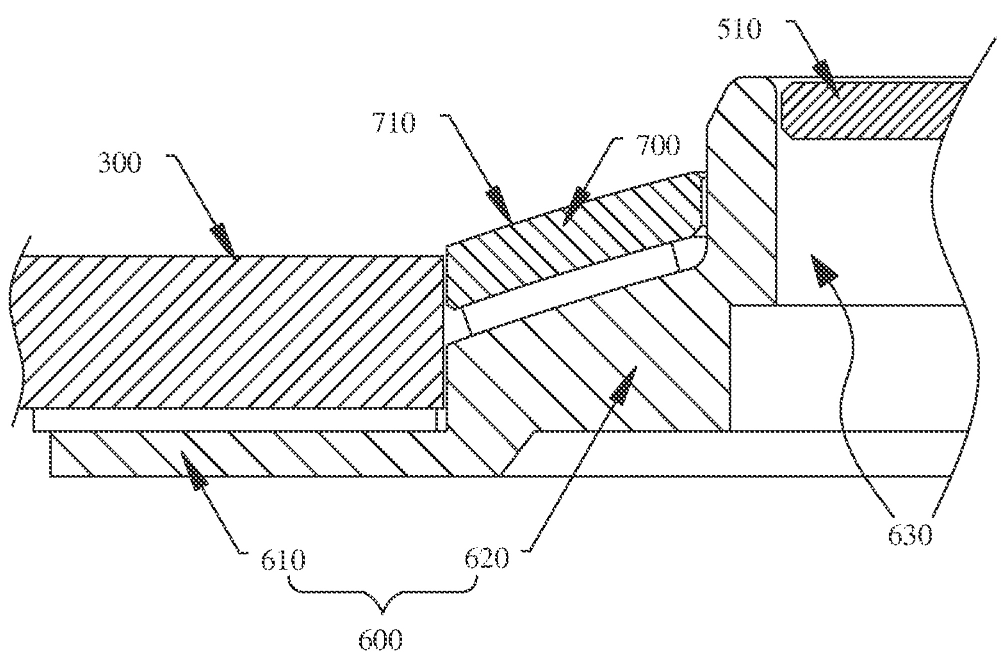
FIG. 10 is a cross-sectional view of partial structures of a mounting member, a rear cover, and a decorative ring according to an embodiment of this application.

In addition, as shown in FIG. 10, the electronic device 10 provided in this application further includes a decorative ring 700. The decorative ring 700 is attached and fixed to the second portion 620, and is arranged to extend around the fixing hole 630 of the second portion 620 through one circle. A surface of the decorative ring 700 away from the mounting member 600 is a first surface 710, and the first surface 710 is an inclined surface. A vertical distance between an inner ring edge of the first surface 710 and the rear cover 300 is a first distance, a vertical distance between an outer ring edge of the first surface 710 and the rear cover 300 is a second distance, and the first distance is greater than the second distance.

In this way, by arranging the decorative ring 700 between the rear cover 300 and the second portion 620 of the mounting member 600, the overall aesthetic of the electronic device 10 is improved. The first surface 710 of the decorative ring 700 is arranged to be an inclined surface, and the first distance is greater than the second distance, so that the decorative ring 700 forms a crater structure between the mounting hole 310 of the rear cover 300 and the second portion 620 of the mounting member 600. That is, a gradually extending structure is formed between a part of the second portion 620 that protrudes from the rear cover 300 and the rear cover 300, so that the second portion 620, the rear cover 300, and the decorative ring 700 form an appearance integration, thereby being conducive to improving the overall aesthetic.

In addition, by arranging the first surface 710 of the decorative ring 700 to be an inclined surface, an inclined surface for transition is formed between the second portion 620 of the mounting member 600 and the rear cover 300. When a user holds the electronic device 10, the decorative ring 700 can support a palm of the user, to increase a contact area between the electronic device 10 and the palm of the user, so that the user does not feel uncomfortable due to the protruding part on the rear cover 300, thereby being conducive to improving a sense of comfort of the user when holding the electronic device 10, and improving user experience.

It is to be noted that, the first portion 610 of the mounting member 600 and the rear cover 300, as well as the second portion 620 of the mounting member 600 and the decorative ring 700, may be fixedly connected by using an adhesive, for example, a back adhesive. Another fixing manner may also be used, and this application sets no special limitation thereto.

As shown in FIG. 10, an overall thickness of the foregoing decorative ring 700 may be exactly the same, that is, the decorative ring 700 is made by using materials with the same thickness, and a cross-section of the decorative ring is of an approximately rectangular structure. In this case, a region where the second portion 620 of the mounting member 600 is attached and fixed to the decorative ring 700 may just be arranged to be an inclined surface whose inclination angle is the same an inclination angle of the first surface 710. In this way, it is conducive to reducing a processing difficulty of the decorative ring 700 to further reduce production costs.

Figure 11:
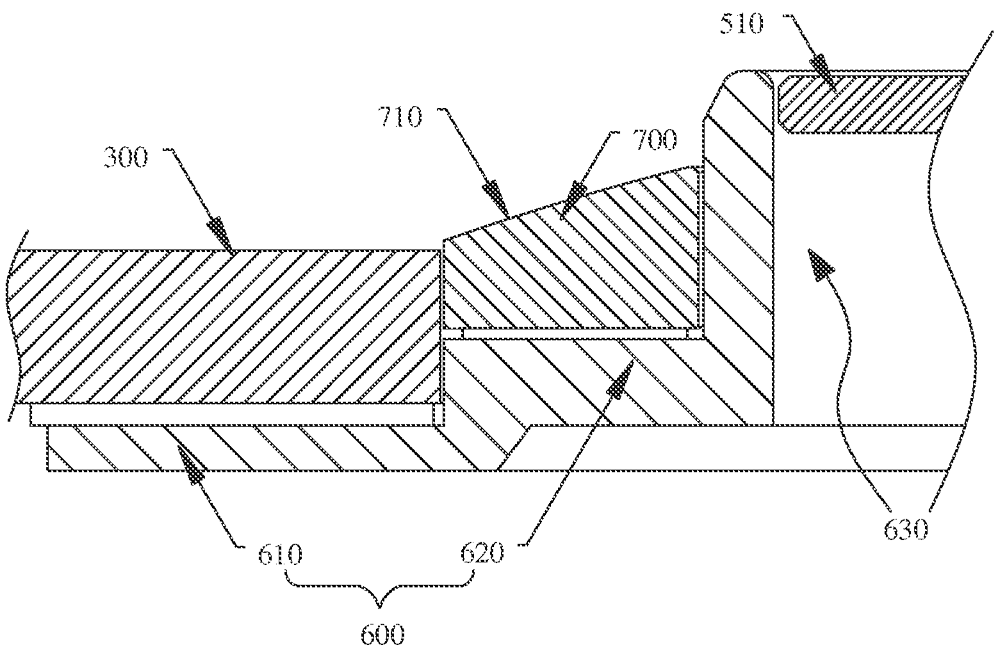
FIG. 11 is a cross-sectional view of partial structures of another decorative ring, a mounting member, and a rear cover according to an embodiment of this application.

In another embodiment, as shown in FIG. 11, the overall thickness of the decorative ring 700 may also not be exactly the same. For example, the first surface 710 of the decorative ring 700 is arranged to be an inclined surface, and a surface opposite to the first surface 710 is arranged to be a planar surface, that is, the cross-section of the decorative ring 700 is of an approximately right-angle trapezoidal structure. In this case, the region where the second portion 620 of the mounting member 600 is attached and fixed to the decorative ring 700 is arranged to be a planar surface, so that a fixed connection between the decorative ring 700 and the second portion 620 can be implemented.

Figure 12:
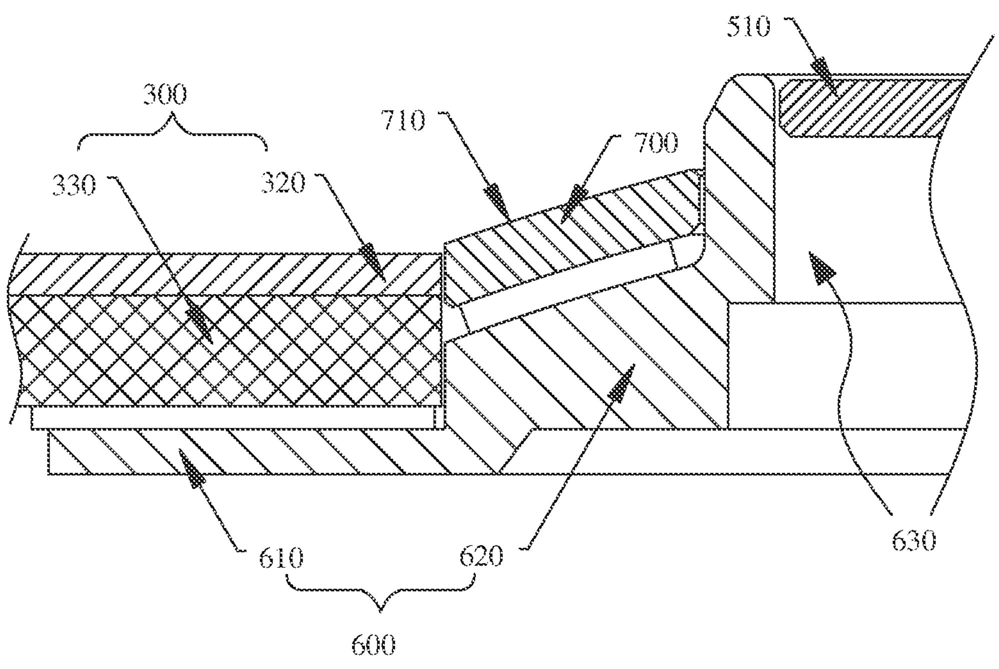
FIG. 12 is a cross-sectional view of partial structures of another rear cover, a mounting member, and a decorative ring according to an embodiment of this application.

In addition, to further improve the overall aesthetic of the electronic device 10, as shown in FIG. 12, the rear cover 300 provided in this application may include a rear cover body 330 and a decorative layer 320. The decorative layer 320 is attached and fixed to a surface of the rear cover body 330 away from the mounting member 600. The overall aesthetic of the back of the electronic device 10 can be improved through the decorative layer 320.

Exemplarily, the foregoing decorative layer 320 may be made of a PU (polyurethane, polyurethane) material. The rear cover body 330 is covered by using the PU material, so that the overall rear cover 300 is more aesthetic. In addition, elastic performance of the PU material is between plastic and rubber. Therefore, when the user holds the electronic device 10, a touch feeling of the rear cover 300 made of the PU material is better, and the user experience can be improved.

In some embodiments, the foregoing rear cover body 330 may be made of a glass fiber material or a PC (Polycarbonate, polycarbonate) material, thereby forming a support.

It is to be noted that, both the foregoing decorative layer 320 and the rear cover body 330 are not limited to the foregoing materials, which may be replaced with other materials. Therefore, this application sets no special limitation thereto.

Figure 13:
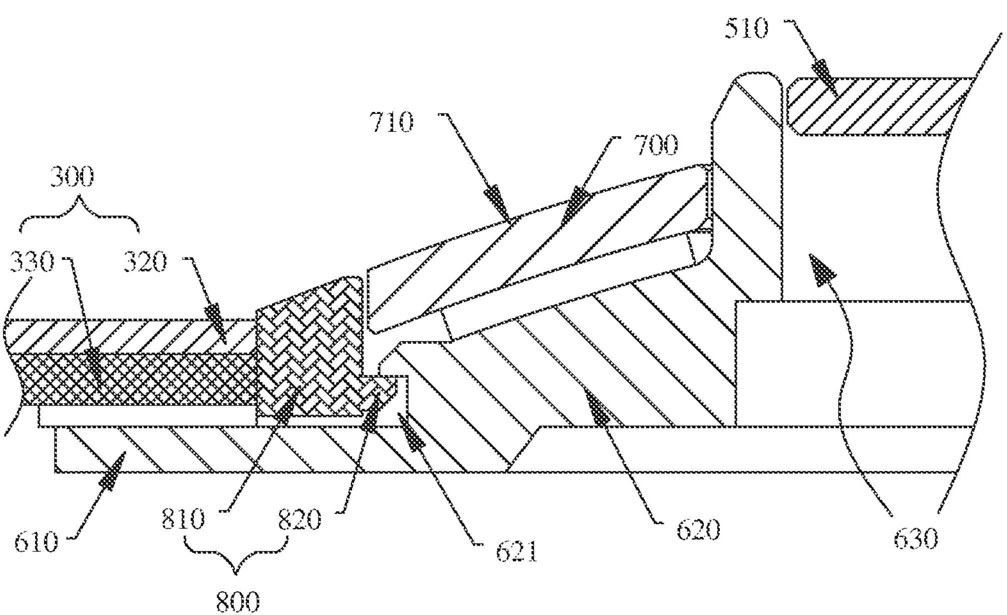
FIG. 13 is a cross-sectional view of partial structures of a connecting member, a mounting member, a rear cover, and a decorative ring according to an embodiment of this application.

Based on this, as shown in FIG. 13, the foregoing connecting member 800 provided in this embodiment of this application is arranged between an inner wall of the mounting hole 310 and an outer wall of the decorative ring 700, the connecting member 800 is connected to the mounting member 600, and the connecting member 800 abuts against both the rear cover 300 and the decorative ring 700. In this way, the connecting member 800 is arranged between the mounting hole 310 of the rear cover 300 and the decorative ring 700, and the connecting member 800 is connected to the mounting member 600, so that overall connection strength can be improved, and a transition between the rear cover 300 and the decorative ring 700 is smoother, thereby being conducive to further improving the overall aesthetic.

In some embodiments, the connecting member 800, the decorative ring 700, and the mounting member 600 may each be of a different color, so that an appearance of the electronic device 10 is more colorful, and the overall aesthetic can be further improved.

Specifically, the foregoing connecting member 800 includes a connecting body 810 and a snap hook 820. The connecting body 810 is arranged between the inner wall of the mounting hole 310 and the outer wall of the decorative ring 700. The snap hook 820 is connected to the connecting body 810 to be an integral structure. A snap groove 621 is arranged on the second portion 620 of the mounting member 600, and the snap hook 820 is in a snap connection to the snap groove 621. Therefore, a snap connection of the connecting member 800 and the mounting member 600 can be implemented. On one hand, the snap connection of the connecting member 800 and the mounting member 600 can be implemented, to improve connection strength of an overall structure. On the other hand, difficulties of mounting and disassembly can be reduced, thereby facilitating disassembly and maintenance of the electronic device 10.

Figure 14:
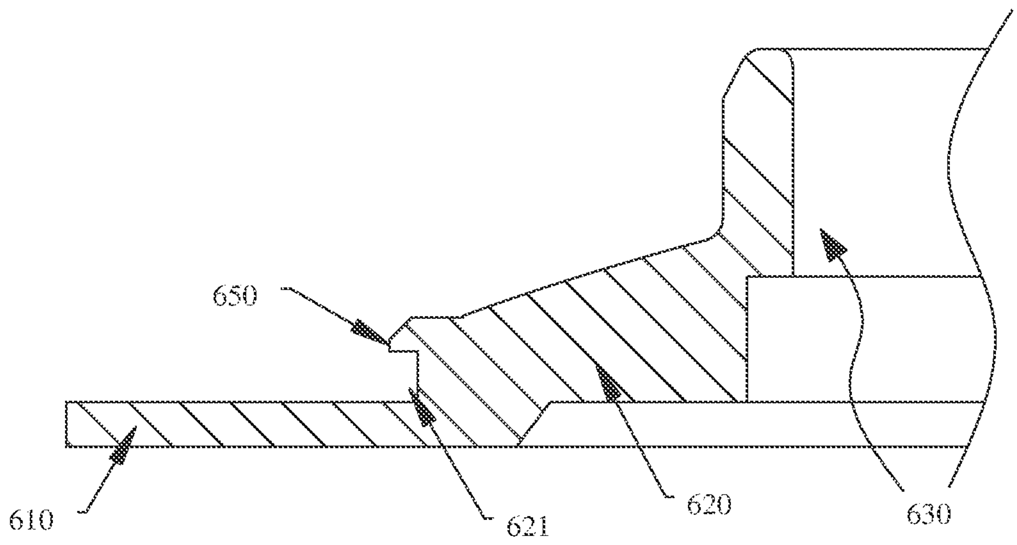
FIG. 14 is a cross-sectional view of a partial structure of a mounting member according to an embodiment of this application.

In some embodiments, as shown in FIG. 13 and FIG. 14, a step surface 650 may be formed between the first portion 610 of the mounting member 600 and the second portion 620 of the mounting member 600. That is, at a junction of the second portion 620 and the first portion 610, the second portion 620 is higher than the first portion 610 to form the step surface 650, that is, the step surface 650 faces a direction away from the fixing hole 630. In addition, the foregoing snap groove 621 is arranged on the step surface 650, thereby allowing the snap hook 820 to snap into the snap groove 621.

Figure 15:
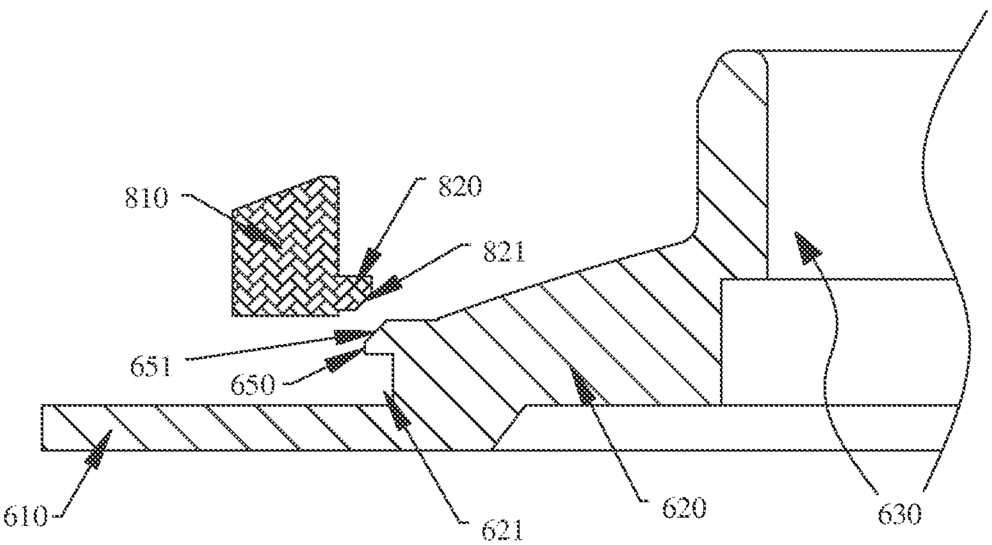
FIG. 15 is a cross-sectional view of partial structures of a connecting member and a mounting member according to an embodiment of this application.

To allow the foregoing snap hook 820 to snap into the snap groove 621, thereby reducing the difficulty of mounting, as shown in FIG. 15, a first guide inclined surface 821 is arranged on a surface of the snap hook 820 that faces the first portion 610, a second guide inclined surface 651 is arranged on an edge of the step surface 650 away from the first portion 610, and an inclination angle of the first guide inclined surface 821 is the same as an inclination angle of the second guide inclined surface 651. In this way, when mounting the connecting member 800, when the snap hook 820 abuts against the second portion 620, that is, the first guide inclined surface 821 and the second guide inclined surface 651 abut against each other, because the first guide inclined surface and the second guide inclined surface are inclined surfaces, a force parallel to the inclined surfaces can be generated between the first guide inclined surface and the second guide inclined surface, so that the snap hook 820 and the second portion 620 can relatively slide along the inclined surfaces, to allow the snap hook 820 to snap into the snap groove 621, thereby being conducive to reducing the difficulty of mounting.

Figure 16:
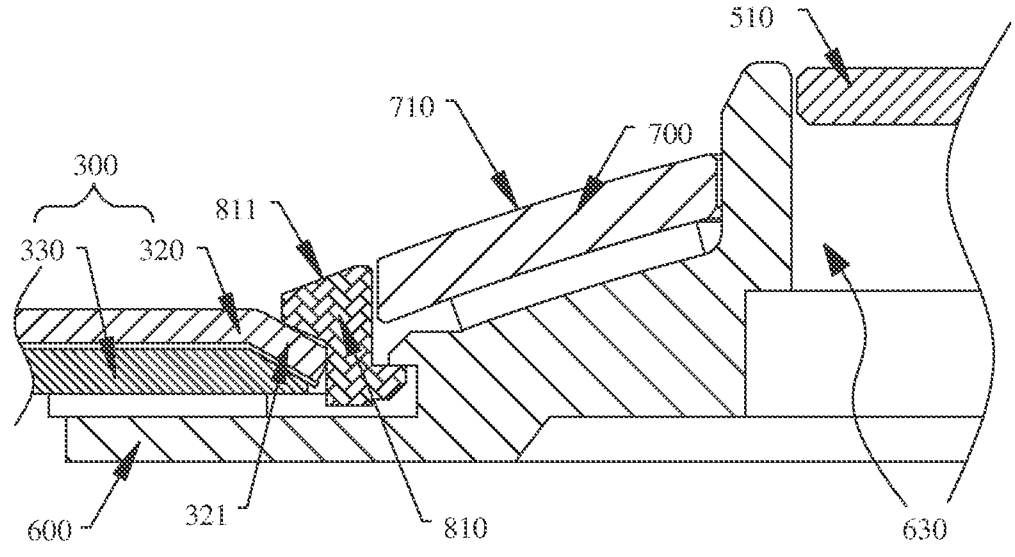
FIG. 16 is a cross-sectional view of partial structures of another rear cover, a connecting member, a mounting member, and a decorative ring according to an embodiment of this application.

In addition, as shown in FIG. 16, a surface of the connecting body 810 away from the snap hook 820 is a second surface 811, the second surface 811 is an inclined surface, and an inclination angle of the second surface 811 is the same as an inclination angle of the first surface 710. In this way, the transition between the decorative ring 700 and the rear cover 300 can be smoother, thereby being more conducive to implementation of appearance integration of the decorative ring 700 and the rear cover 300, and further improving an overall appearance effect.

To further improve the connection strength of the overall structure, as shown in FIG. 16, an edge of the mounting hole 310 of the rear cover 300 is bent in a direction close to the mounting member 600 to form an abutting portion 321, and a surface of the connecting body 810 that faces the mounting member 600 abuts against a surface of the abutting portion 321 away from the mounting member 600. The edge of the mounting hole 310 of the rear cover 300 abuts between the connecting body 810 and the mounting member 600. In this way, the connection strength between the rear cover 300 and the mounting member 600 can be further improved.

In addition, the edge of the mounting hole 310 can be hidden by the connecting body 810, thereby preventing a material on the edge of the mounting hole 310 from falling off. For example, at the edge of the mounting hole 310, the foregoing decorative layer 320 separates from the rear cover body 330, resulting in damage to the rear cover 300. Therefore, the edge of the mounting hole 310 can be protected, to prolong a use life of the rear cover 300.

Exemplarily, the foregoing abutting portion 321 may be formed on an edge of the decorative layer 320. In addition, an inclined surface inclined to the direction close to the mounting member 600 is formed on the rear cover body 330, which enables the abutting portion 321 to be attached to the inclined surface, so that the abutting portion 321 can abut against the surface of the connecting body 810 that faces the mounting member 600.

Based on this, as shown in FIG. 16, the foregoing lens 510 is fixed to the fixing hole 630 on the second portion 620 of the mounting member 600, to prevent the lens 510 from moving along a direction perpendicular to an axis of the fixing hole 630. The lens 510 may abut against an inner wall of the fixing hole 630, so that the lens 510 can be limited from moving along the direction perpendicular to the axis of the fixing hole 630, and a limit is formed to the lens 510 to prevent the lens 510 from moving, which helps to ensure a photographing effect.

Figure 17:
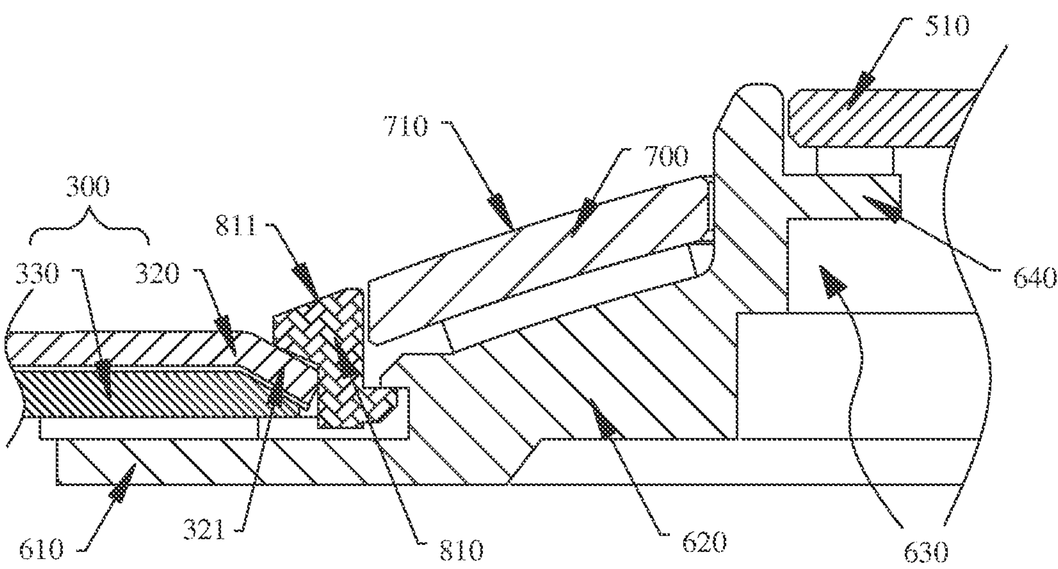
FIG. 17 is a cross-sectional view of partial structures of another mounting member, a connecting member, a rear cover, and a decorative ring according to an embodiment of this application.

A side wall of the lens 510 and the inner wall of the fixing hole 630 may be fixedly connected by using an adhesive. As shown in FIG. 17, a boss 640 may also be formed on the inner wall of the fixing hole 630, and the lens 510 is fixed to a surface of the boss 640 that faces the outside of the rear cover 300. The lens 510 can be supported by the boss 640, thereby improving support strength of the overall structure. In addition, the lens 510 is fixedly connected to the boss 640, thereby implementing a fixed connection of the lens 510 and the mounting member 600.

In addition, the boss 640 may extend circumferentially around the fixing hole 630 through one circle, so that an attachment area between the boss 640 and the lens 510 can be increased, to improve fixing strength between the lens 510 and the mounting member 600. Exemplarily, the lens 510 may be fixed to the boss 640 by using a back adhesive, thereby implementing the fixed connection by using the adhesive.

Figure 18:
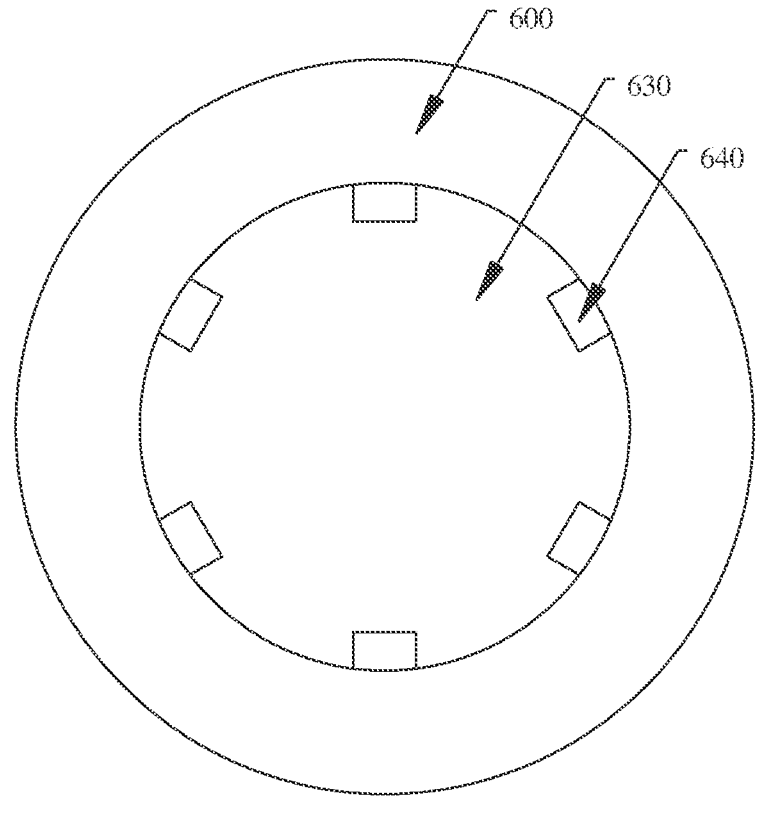
FIG. 18 is a structural diagram of a top view of another boss according to an embodiment of this application.

In another embodiment, as shown in FIG. 18, a plurality of bosses 640 may also be arranged, and the plurality of bosses 640 are evenly distributed circumferentially around the fixing hole 630, thereby forming a balanced support and even force. Therefore, an arrangement manner of the boss is not specifically limited in this application.

It is to be noted that, the foregoing lens 510 may be bonded and fixed to the boss 640 by using the adhesive, for example, by using the back adhesive to bond and fix the lens to the boss. Another adhesive material may also be used to perform gluing fixation. This application sets no special limitation thereto.

In the descriptions of this specification, the specific features, structures, materials, or characteristics may be combined in a proper manner in any one or more of the embodiments or examples.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, comprising:

a rear cover, wherein a mounting hole extends in the rear cover;

a mounting member, wherein the mounting member is fixed to an inner wall of the rear cover, a part of the mounting member protrudes from the mounting hole, and a fixing hole extends in the part of the mounting member that protrudes from the mounting hole;

a camera assembly, comprising a lens, wherein the lens is fixed to the fixing hole;

a decorative ring, fixed to the part of the mounting member that protrudes from the mounting hole, wherein a surface of the decorative ring that does not face towards the mounting member is a first surface, the first surface is an inclined surface, a vertical distance between an inner ring edge of the first surface and the rear cover is a first distance, a vertical distance between an outer ring edge of the first surface and the rear cover is a second distance, and the first distance is greater than the second distance; and a connecting member, arranged between an inner wall of the mounting hole and an outer wall of the decorative ring, wherein the connecting member is connected to the mounting member, and the connecting member abuts against the rear cover and the decorative ring, and wherein the connecting member comprises:

a connecting body, arranged between the inner wall of the mounting hole and the outer wall of the decorative ring; and a snap hook, connected to the connecting body to be an integral structure, wherein a snap groove is arranged on the mounting member, and the snap hook is in a snap connection to the snap groove; and wherein a surface of the connecting body that faces away from the snap hook is a second surface, the second surface is an inclined surface, and an inclination angle of the second surface is the same as an inclination angle of the first surface.

2. The electronic device according to claim 1, wherein the mounting member comprises:

a first portion, fixedly connected to the inner wall of the rear cover; and a second portion, connected to the first portion to be an integral structure, wherein the second portion protrudes from the mounting hole, and the fixing hole extends in the second portion.

3. The electronic device according to claim 2, wherein a step surface is at a junction of the first portion and the second portion, the step surface faces a direction away from the fixing hole, and the snap groove is arranged on the step surface.

4. The electronic device according to claim 3, wherein a first guide inclined surface is arranged on a surface of the snap hook that faces the first portion, and the first guide inclined surface is configured to guide the snap hook to snap into the snap groove.

5. The electronic device according to claim 4, wherein a second guide inclined surface is arranged on an edge of the step surface that is farthest away from the first portion, and an inclination angle of the second guide inclined surface is the same as an inclination angle of the first guide inclined surface.

6. The electronic device according to claim 5, wherein an edge of the mounting hole is bent in a direction facing the mounting member to form an abutting portion, and a surface of the connecting body that faces the mounting member abuts against a surface of the abutting portion away from the mounting member.

7. The electronic device according to claim 6, wherein the rear cover comprises:

a rear cover body; and a decorative layer, fixed to a surface of the rear cover body that faces away from the mounting member, wherein the abutting portion is formed on the decorative layer.

8. The electronic device according to claim 7, wherein the decorative layer is made of a polyurethane material.

9. The electronic device according to claim 7, wherein the rear cover body is made of a glass fiber material or a polycarbonate material.

10. The electronic device according to claim 9, wherein a boss is on an inner wall of the fixing hole, and the lens is fixed to a surface of the boss that faces the outside of the electronic device.

11. The electronic device according to claim 10, wherein the boss extends circumferentially around the fixing hole through a circle.

12. The electronic device according to claim 10, wherein a plurality of bosses are evenly distributed circumferentially around the fixing hole.

13. An electronic device, comprising:

a rear cover defining a mounting hole, the rear cover comprising a rear cover body and a decorative layer;

a mounting member, wherein a first part of the mounting member is fixed under the rear cover, a second part of the mounting member protrudes from the mounting hole, and the second part of the mounting member that protrudes from the mounting hole defines a fixing hole;

a camera assembly, comprising a lens, wherein the lens is fixed in the fixing hole;

a decorative ring, fixed to the second part of the mounting member that protrudes from the mounting hole, wherein a surface of the decorative ring that faces away from the first part of the mounting member is a first surface, the first surface is an inclined surface, a vertical distance between an inner ring edge of the first surface and the rear cover is a first distance, a vertical distance between an outer ring edge of the first surface and the rear cover is a second distance, and the first distance is greater than the second distance; and a connecting member, arranged between an inner wall defining the mounting hole and an outer wall of the decorative ring, wherein the connecting member is connected to the mounting member, and the connecting member abuts against the rear cover and the decorative ring, and wherein the connecting member comprises:

a connecting body, arranged between the inner wall defining the mounting hole and the outer wall of the decorative ring; and a snap hook, connected to the connecting body to be an integral structure, wherein a snap groove is arranged on the mounting member, and the snap hook is in a snap connection to the snap groove; and wherein a surface of the connecting body that faces away from the snap hook is a second surface, the second surface is an inclined surface, and an inclination angle of the second surface is the same as an inclination angle of the first surface.

14. The electronic device according to claim 13, wherein a step surface is at a junction of the first part of the mounting member and the second part of the mounting member, the step surface faces a direction away from the fixing hole, and the snap groove is arranged on the step surface.

15. The electronic device according to claim 13, wherein a first guide inclined surface is arranged on a surface of the snap hook, and the first guide inclined surface is configured to guide the snap hook to snap into the snap groove.

16. The electronic device according to claim 13, wherein an edge defining the mounting hole is bent in a direction facing the mounting member to form an abutting portion, and a surface of the connecting body that faces the mounting member abuts against a surface of the abutting portion.

17. The electronic device according to claim 16, wherein the abutting portion is formed on the decorative layer.

18. The electronic device according to claim 13, wherein the decorative layer is made of a polyurethane material.

19. The electronic device according to claim 13, wherein the rear cover body is made of a glass fiber material or a polycarbonate material.

20. The electronic device according to claim 19, wherein a boss is on an inner wall defining the fixing hole, and the lens is fixed to a surface of the boss that faces outside of the electronic device.

* * * * *